W. WHITFORD.
Nut-Lock.

No. 203,686. Patented May 14, 1878.

Attest:
Jno. P. Brooks.
Jno. A. Madigan.

Inventor:
William Whitford,
by C. A. Snow & Co.
Attorney

UNITED STATES PATENT OFFICE.

WILLIAM WHITFORD, OF KENDALLVILLE, INDIANA.

IMPROVEMENT IN NUT-LOCKS.

Specification forming part of Letters Patent No. 203,686, dated May 14, 1878; application filed February 12, 1878.

*To all whom it may concern:*

Be it known that I, WILLIAM WHITFORD, of Kendallville, in the county of Noble and State of Indiana, have invented certain new and useful Improvements in Nut-Locks; and I do hereby declare that the following is a full, clear, and exact description thereof, which will enable others skilled in the art to which it appertains to make and use the same, reference being had to the accompanying drawings, which form a part of this specification, and in which—

Figure 1:
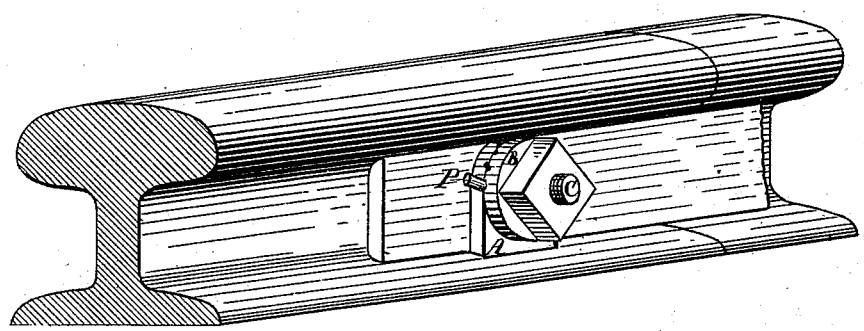
Figure 2:
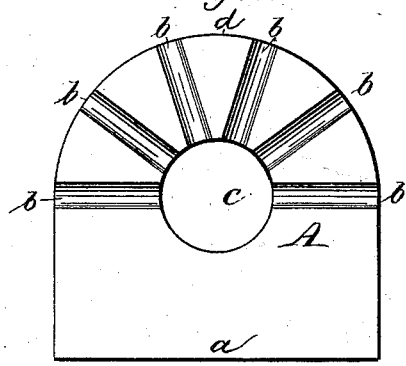
Figure 3:
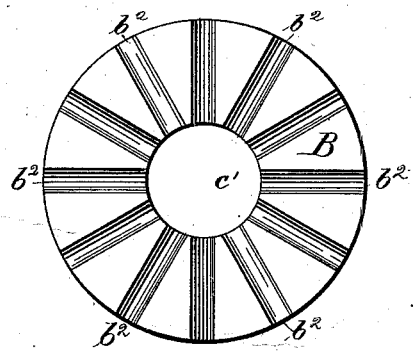
Figure 5:
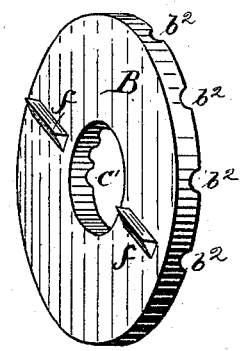
Figure 4:
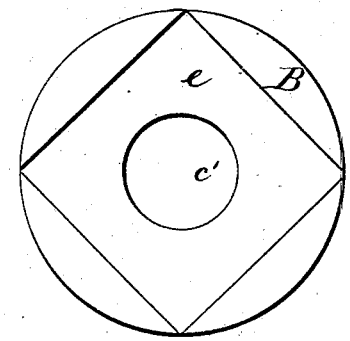

Figure 1 is a perspective view of my improved nut-locking device applied to a railroad fish-plate. Fig. 2 is a plan view of the lower washer. Fig. 3 is a rear view of the upper washer. Fig. 4 is a front view of the upper washer; and Fig. 5 is a perspective view, showing a modification in the construction of the lower washer.

Similar letters of reference denote corresponding parts in all the figures.

My invention relates to certain improvements in nut-locks; and it consists in the construction and arrangement of parts, hereinafter described, by which the nut may be easily and securely locked in position or detached without injury to any of the parts of which the locking device is composed.

In the drawings, A is the lower washer. The upper side of this is semicircular in shape, and the lower side is squared off, as shown at $a$. It is provided with a perforation, $c$, from which (upon the front face of the washer) radial grooves $b\ b$ extend to the semicircular periphery $d$. B is the upper washer. This is circular in shape, and it is provided with a central perforation, $c'$, from which radial grooves $b^2\ b^2$ extend to the periphery of the washer upon its rear side. These grooves, which may be equidistant, should, upon the upper washer B, be somewhat closer together than upon the lower washer A, or vice versa. The washer B is, upon its front side, provided with a shallow recess, $e$, to receive the nut.

The operation of my invention will be readily understood by reference to Fig. 1 of the accompanying drawings. After adjusting the bolt C in its proper position the washer A is slid upon it, with its lower square side resting upon the bottom flange of the rail. The washer B is then slid upon the bolt, (with its grooved side facing that of washer A,) and finally the nut D is adjusted and screwed down. Care should be taken that the nut enters the recess $e$ in washer B, so that the latter will turn with the nut when it is screwed home. When this is done it will be found that two of the grooves $b\ b^2$ in washers A B will be nearly or quite opposite each other. If not quite, they may be brought to by a very slight turn of the nut, owing to the difference in their relative distances upon the washers A B, respectively, so as to admit of the insertion of a small pin, P, which prevents the washer B and the nut from turning back. The lower square end of washer A, which rests against the flange of the rail, prevents the whole device from turning. To prevent the pin P from falling out, the nut may, after it has been inserted, be turned slightly back, thus causing it to be held securely in position.

When my improved nut-locking device is to be used for other purposes than the one just described, I prefer to provide the washer A upon its rear side with one or more spurs, $f\ f$, which, by entering the metal or wooden backing, or recesses therein, will prevent the device from turning.

Having thus described my invention, I claim and desire to secure by Letters Patent of the United States—

The combination of the washer A, having equidistant radial grooves $a\ a$, with the washer B, having recess $e$ and equidistant radial grooves $b^2\ b^2$, and the pin P, the grooves in washer B being closer together than those in washer A, or vice versa, substantially as described, for the purpose herein shown and specified.

In testimony that I claim the foregoing as my own I have hereto affixed my signature in presence of two witnesses.

WILLIAM WHITFORD.

Witnesses:
   THOMAS L. GRAVES,
   ALBERT WHITFORD.